(12) United States Patent
Shih et al.

(10) Patent No.: US 12,510,690 B2
(45) Date of Patent: Dec. 30, 2025

(54) OPHTHALMIC DEVICES

(71) Applicant: Bausch + Lomb Ireland Limited, Dublin (IE)

(72) Inventors: Feng-Yang Shih, Rochester, NY (US); Mohammad Vatankhah Varnosfaderani, Rochester, NY (US); Alok Kumar Awasthi, Jr., Pittsford, NY (US)

(73) Assignee: BAUSCH + LOMB IRELAND LIMITED, Dublin (IE)

( * ) Notice: Subject to any disclaimer, the term of this patent is extended or adjusted under 35 U.S.C. 154(b) by 557 days.

(21) Appl. No.: 18/103,788

(22) Filed: Jan. 31, 2023

(65) Prior Publication Data

US 2023/0266505 A1 Aug. 24, 2023

Related U.S. Application Data

(60) Provisional application No. 63/313,413, filed on Feb. 24, 2022.

(51) Int. Cl.
*A61L 27/18* (2006.01)
*C08G 73/02* (2006.01)
*G02B 1/04* (2006.01)

(52) U.S. Cl.
CPC ............ *G02B 1/043* (2013.01); *A61L 27/18* (2013.01); *C08G 73/0233* (2013.01)

(58) Field of Classification Search
CPC combination set(s) only.
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 4,113,224 A | 9/1978 | Clark et al. | |
| 4,197,266 A | 4/1980 | Clark et al. | |
| 4,327,203 A | 4/1982 | Deichert et al. | |
| 4,355,147 A | 10/1982 | Deichert et al. | |
| 4,555,732 A | 11/1985 | Tuhro | |
| 4,910,277 A | 3/1990 | Bambury et al. | |
| 5,070,215 A | 12/1991 | Bambury et al. | |
| 5,270,418 A | 12/1993 | Kunzler et al. | |
| 5,271,875 A | 12/1993 | Appleton et al. | |
| 5,789,487 A * | 8/1998 | Matyjaszewski | C08F 290/068 526/172 |
| 5,807,937 A * | 9/1998 | Matyjaszewski | C08F 257/02 526/135 |
| 6,447,920 B1 * | 9/2002 | Chabrecek | C08J 7/16 427/2.24 |
| 6,517,933 B1 | 2/2003 | Soane et al. | |
| 6,790,809 B2 * | 9/2004 | Suzuki | B41M 5/3372 503/201 |
| 9,309,357 B2 | 4/2016 | Awasthi et al. | |
| 2001/0044482 A1 * | 11/2001 | Hu | C08F 265/04 525/903 |
| 2003/0044468 A1 | 3/2003 | Cellesi et al. | |
| 2008/0151180 A1 * | 6/2008 | Vanderbilt | A61L 12/14 351/159.02 |
| 2009/0218705 A1 * | 9/2009 | Patterson | B29C 33/64 264/1.1 |
| 2012/0283381 A1 * | 11/2012 | Tamiya | C08L 83/10 524/588 |
| 2013/0317131 A1 * | 11/2013 | Scales | C08L 53/00 526/306 |
| 2020/0270371 A1 * | 8/2020 | Hsieh | C08B 37/003 |

FOREIGN PATENT DOCUMENTS

GB 2339202 A 1/2020
WO PCT/EP2023/054523 A1 5/2023

OTHER PUBLICATIONS

Edmondo M. Benetti et al., "Using Polymers to Impart Lubricity and Biopassivity to Surfaces: Are These Properties Linked?", Helv. Chim. Acta., 2019, 11 pages, vol. 102, No. 5.
Giulia Morgese et al., "Mixing Poly(ethylene glycol) and Poly(2-alkyl-2-oxazoline)s Enhances Hydration and Viscoelasticity of Polymer Brushes and Determines Their Nanotribological and Antifouling Properties", ACS Appl. Mater. Interfaces, 2018, pp. 41839-41848, 10.
Giulia Morgese et al., "Hairy and Slippery Polyoxazoline-Based Copolymers on Model and Cartilage Surfaces", Biomacromolecules, 2018, pp. 680-690, 19.
Wenqing Yan et al., "Bioinert and Lubricious Surfaces by Macromolecular Design", Langmuir, 2019, pp. 13521-13535, 35.
Giulia Morgese et al., "Nanoassemblies of Tissue-Reactive, Polyoxazoline Graft-Copolymers Restore the Lubrication Properties of Degraded Cartilage," ACS Nano., 2017, pp. 2794-2804, 11.
Richard Hoogenboom et al., "Poly(2-oxazoline)s: A Polymer Class with Numerous Potential Applications", Angew. Chem. Int. Ed., 2009, pp. 7978-7994, 48.
Mirko Einzmann et al., "Novel Functional Initiators for Oxazoline Polymerization", Journal of Polymer Science: Part A: Polymer Chemistry, 2001, pp. 2821-2831, 39.
Mathias Glassner et al., "Poly(2-oxazoline)s: A comprehensive overview of polymer structures and their physical properties", Polym Int., 2018, pp. 32-45, 67.

* cited by examiner

*Primary Examiner* — Peter A Salamon
(74) *Attorney, Agent, or Firm* — Michael E. Carmen; John E. Thomas

(57) ABSTRACT

An ophthalmic device which is a polymerization product of a monomeric mixture includes (a) one or more cationic initiators comprising one or more polymerizable groups; and (b) one or more alkyl-substituted oxazolines.

20 Claims, No Drawings

OPHTHALMIC DEVICES

PRIORITY CLAIM

The present application claims priority to U.S. Provisional Patent Application Ser. No. 63/313,413, entitled "Ophthalmic Device," filed Feb. 24, 2022, and incorporated by reference herein in its entirety.

BACKGROUND

Ophthalmic devices such as contact lenses are made of various polymeric materials, including rigid gas permeable materials, soft elastomeric materials, and soft hydrogel materials. The majority of contact lenses sold today are made of soft hydrogel materials. Hydrogels are a cross-linked polymeric system that absorb and retain water, typically 10 to 80 percent by weight. Hydrogel lenses are commonly prepared by polymerizing a lens-forming monomeric mixture. In the case of silicone hydrogel lenses, a silicone-containing monomer is copolymerized with a hydrophilic monomer.

SUMMARY

In accordance with an illustrative embodiment, an ophthalmic device which is a polymerization product of a monomeric mixture comprises:
(a) one or more cationic initiators comprising one or more polymerizable groups; and
(b) one or more alkyl-substituted oxazolines.

In accordance with another illustrative embodiment, a method for making an ophthalmic device comprises:
(a) providing an ophthalmic device-forming monomeric mixture comprising:
  (i) one or more cationic initiators comprising one or more polymerizable groups; and
  (ii) one or more alkyl-substituted oxazolines;
(b) subjecting the mixture to polymerization conditions to provide a polymerized ophthalmic device; and
(c) hydrating the polymerized ophthalmic device.

DETAILED DESCRIPTION

Various illustrative embodiments described herein are directed to ophthalmic devices. In the field of ophthalmic devices, various physical and chemical properties such as, for example, oxygen permeability, wettability, material strength and stability are but a few of the factors that must be carefully balanced in order to provide a useable ophthalmic device such as a contact lens. For example, since the cornea receives its oxygen supply from contact with the atmosphere, oxygen permeability is an important characteristic for certain contact lens material. Wettability also is important in that, if the lens is not sufficiently wettable, it does not remain lubricated and therefore cannot be worn comfortably in the eye. Accordingly, the optimum contact lens would have at least both excellent oxygen permeability and excellent tear fluid wettability.

Those skilled in the art have long recognized the need for modifying the surface of contact lenses so that they are compatible with the eye. It is known that increased hydrophilicity of the lens surface improves the wettability of the contact lens. This, in turn, is associated with improved wear comfort of contact lenses. Additionally, the surface of the lens can affect the lens's susceptibility to deposition, particularly the deposition of proteins and lipids resulting from tear fluid during lens wear. Accumulated deposition can cause eye discomfort or even inflammation. In the case of extended wear lenses (i.e., lenses used without daily removal of the lens before sleep), the surface is especially important, since extended wear lenses must be designed for high standards of comfort and biocompatibility over an extended period of time.

The ophthalmic devices described herein advantageously provide for increased lubricity, antifouling property, and water content, and therefore, improved comfort. The ophthalmic devices described herein are intended for direct contact with body tissue or body fluid. As used herein, the term "ophthalmic device" refers to devices that reside in or on the eye. These devices can provide optical correction, wound care, drug delivery, diagnostic functionality or cosmetic enhancement or effect or a combination of these properties. Useful ophthalmic devices include, but are not limited to, ophthalmic lenses such as soft contact lenses, e.g., a soft, hydrogel lens, soft, non-hydrogel lens and the like, hard contact lenses, e.g., a hard, gas permeable lens material and the like, intraocular lenses, overlay lenses, ocular inserts, optical inserts and the like. As is understood by one skilled in the art, a lens is considered to be "soft" if it can be folded back upon itself without breaking.

As used herein, the term "(meth)" denotes an optional methyl substituent. Thus, for example, terms such as "(meth) acrylate" denotes either methacrylate or acrylate, and "(meth)acrylamide" denotes either methacrylamide or acrylamide.

In an illustrative embodiment, an ophthalmic device described herein will have an equilibrium water content of at least about 20 weight percent. In another illustrative embodiment, an ophthalmic device described herein will have an equilibrium water content of at least about 30 weight percent. In another illustrative embodiment, an ophthalmic device described herein will have an equilibrium water content of from about 20 weight percent to about 90 weight percent. In another illustrative embodiment, an ophthalmic device described herein will have an equilibrium water content of from about 50 weight percent to about 90 weight percent.

In non-limiting illustrative embodiments, the ophthalmic devices described herein are a polymerization product of a monomeric mixture comprising (a) one or more cationic initiators comprising one or more polymerizable groups; and (b) one or more alkyl-substituted oxazolines.

In illustrative embodiments, cationic initiators comprising one or more polymerizable groups for use herein include, for example, sulfonate cationic initiators comprising one or more polymerizable groups. For example, suitable sulfonate cationic initiators include a substituted or unsubstituted hydrocarbon radical-containing sulfonate cationic initiators comprising one or more polymerizable groups such as substituted or unsubstituted alkyl- and aryl-containing sulfonate cationic initiators comprising one or more polymerizable groups, fluorinated substituted or unsubstituted alkyl- and aryl-containing sulfonate cationic initiators comprising one or more polymerizable groups and the like. Representative examples of such sulfonate cationic initiators include tosylate, nosylate, mesylate, triflate and the like, each comprising one or more polymerizable groups. In non-limiting illustrative embodiments, suitable one or more polymerizable groups include, by way of example, (meth) acrylate end groups, vinyl end groups, acrylamide end groups and the like.

In an illustrative embodiment, a polymerizable group is a methacrylate-containing reactive end group. Suitable methacrylate-containing reactive end groups can be those represented by the structure:

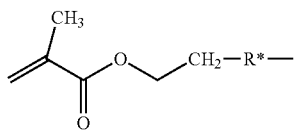

wherein R* is a linking group or bond. Suitable linking groups include, for example, a heteroatom such as O, any divalent hydrocarbon radical or moiety such as independently a straight or branched, substituted or unsubstituted $C_1$-$C_6$ alkyl group, a substituted or unsubstituted $C_3$-$C_{12}$ cycloalkyl group, a substituted or unsubstituted $C_4$-$C_{12}$ cycloalkylalkyl group, a substituted or unsubstituted $C_3$-$C_{12}$ cycloalkenyl group, a substituted or unsubstituted $C_6$-$C_{12}$ aryl group, a substituted or unsubstituted $C_7$-$C_{12}$ arylalkyl group and substituted and unsubstituted ether-containing groups.

In general, one or more cationic initiators comprising one or more polymerizable groups can be obtained by reacting a cationic initiator precursor monomer with a monomer having a first reactive functionality group for reacting with a cationic initiator precursor and a second reactive functionality group which is the one or more polymerizable groups. For example, in illustrative embodiments, a suitable cationic initiator precursor monomer includes, for example, a monomer of the formula R—SO$_2$—X where R is a hydrocarbon radical or moiety such as independently straight or branched, substituted or unsubstituted $C_1$-$C_6$ alkyl group, a substituted or unsubstituted $C_3$-$C_{12}$ cycloalkyl group, a substituted or unsubstituted $C_4$-$C_{12}$ cycloalkylalkyl group, a substituted or unsubstituted $C_6$-$C_{12}$ aryl group, and a substituted or unsubstituted $C_7$-$C_{12}$ arylalkyl group, and X is a halogen such as chlorine, fluorine, bromine and the like. In illustrative embodiments, suitable monomers having a first reactive functionality group for reacting with a cationic initiator precursor and a second reactive functionality group which is the one or more polymerizable groups include, for example, hydroxyl-containing (meth)acrylates such as 2-hydroxyethyl methacrylate.

In illustrative embodiments, the reaction is carried out at a temperature ranging from about −20° C. to about 100° C. for a time period ranging from about 30 minutes to about 16 hours. In an illustrative embodiment, the cationic initiator precursor monomer is added to the reaction mixture in an amount ranging from about 0.5 to about 50 wt. %, based on the total weight of the mixture. In an illustrative embodiment, the monomers having a first reactive functionality group for reacting with a cationic initiator precursor monomer and a second reactive functionality group which is the one or more polymerizable groups is added to the reaction mixture in an amount ranging from about 0.5 to about 80 wt. %, based on the total weight of the mixture.

In one embodiment, a representative synthetic scheme for obtaining a cationic initiator comprising one or more polymerizable groups is set forth below.

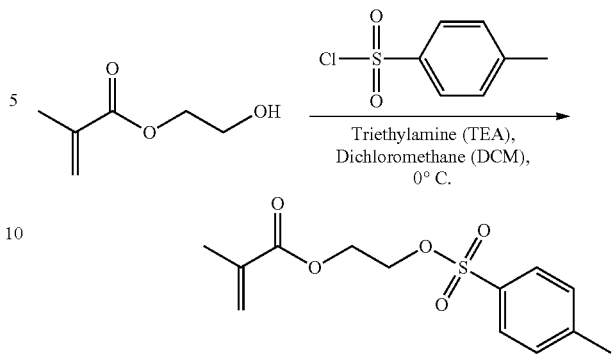

In illustrative embodiments, the one or more cationic initiators comprising one or more polymerizable groups are reacted with an alkyl-substituted oxazoline in a cationic ring opening polymerization of the alkyl-substituted oxazoline to obtain a brush polymeric network comprising poly(2-alkyloxazoline) repeating units in the polymer backbone. A suitable alkyl-substituted oxazoline for use herein is a 2-alkyl-substituted oxazoline represented by the following formula:

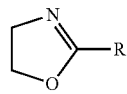

where R is an alkyl group of 1 to 12 carbon atoms. In a non-limiting illustrative embodiment, a 2-alkyl-substituted oxazoline for use herein is 2-isopropenyl-2-oxazoline.

In illustrative embodiments, the poly(2-alkyloxazoline) repeating units are represented as follows:

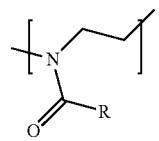

where R is an alkyl group of 1 to 12 carbon atoms. In an illustrative embodiment, the brush polymeric network will comprise from about 3 to about 150 repeating units of the poly(2-alkyloxazoline) in the polymer backbone. In another illustrative embodiment, the brush polymeric network will comprise from about 10 to about 100 repeating units of the poly(2-alkyloxazoline) in the polymer backbone. The brush polymeric network can be formed through combination of different mechanisms. For example, one mechanism includes grafting of polyoxazoline from incorporated cationic initiators in the polymer chains. In another example, a mechanism includes grafting through polyoxazolines that formed from non-incorporated cationic initiators.

In general, "polymer brushes," contain polymer chains, one end of which is directly or indirectly tethered to a surface and another end of which is free to extend from the surface, somewhat analogous to the bristles of a brush. The brush polymeric network described herein have one or more repeating units of poly(2-alkyloxazoline) repeating units, which bind to the one or more polymerizable groups of the cationic initiator creating a hydrophilic surface of the ophthalmic device. As used herein the terms bound", "binding", or terms of similar import, refer to various chemical interactions such as, electrostatic, ionic, complexation, hydrogen bond or other interaction between the one or more cationic initiators comprising one or more polymerizable groups and the alkyl-substituted oxazolines.

In an illustrative embodiment, the monomeric mixture can contain from about 0.1 wt. % to about 30 wt. %, based on the total weight of the monomeric mixture, of the one or more cationic initiators and from about 10 wt. % to about 80 wt. %, based on the total weight of the monomeric mixture, of the one or more alkyl-substituted oxazolines. In an illustrative embodiment, the monomeric mixture can contain from about 0.1 wt. % to about 10 wt. %, based on the total weight of the monomeric mixture, of the one or more cationic initiators and from about 20 wt. % to about 50 wt. %, based on the total weight of the monomeric mixture, of the one or more alkyl-substituted oxazolines.

In non-limiting illustrative embodiments, the monomeric mixtures described herein can further contain one or more crosslinking agents. Suitable crosslinking agents include, for example, crosslinking agents having a number average molecular weight of about 100 to about 20,000 Da, as determined by, for example, an intrinsic viscosity measurement. In non-limiting illustrative embodiments, suitable crosslinking agents include crosslinking agents containing at least two ethylenically unsaturated reactive end groups. In one illustrative embodiment, suitable crosslinking agents containing at least two ethylenically unsaturated reactive end groups include one or more alkanepolyol di(meth)acrylate-containing crosslinking agents such as, for example, one or more alkylene glycol di(meth)acrylate crosslinking agents. Representative example of one or more alkylene glycol di(meth)acrylate crosslinking agents include tetraethylene glycol di(meth)acrylate, ethylene glycol di(meth)acrylates, butyleneglycol di(meth)acrylate and the like.

In one illustrative embodiment, suitable crosslinking agents containing at least two ethylenically unsaturated reactive end groups include one or more end functionalized poloxamers. In an illustrative embodiment, one or more end functionalized poloxamers include one or more poloxamer di(meth)acrylates. A representative example of a suitable poloxamer is an end functionalized poloxamer block copolymer. One specific class of poloxamer block copolymers are those available under the trademark Pluronic (BASF Wyandotte Corp., Wyandotte, Mich.). Poloxamers include Pluronics and reverse Pluronics. Pluronics are a series of ABA block copolymers composed of poly(ethylene oxide)-poly(propylene oxide)-poly(ethylene oxide) blocks as generally represented in Formula I:

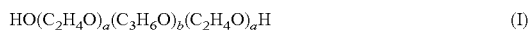

wherein a is independently at least 1 and b is at least 1.

Reverse Pluronics are a series of BAB block copolymers, respectively composed of poly(propylene oxide)-poly(ethylene oxide)-poly(propylene oxide) blocks as generally represented in Formula II:

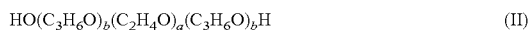

wherein a is at least 1 and b is independently at least 1. The poly(ethylene oxide), PEO, blocks are hydrophilic, whereas the poly(propylene oxide), PPO, blocks are hydrophobic in nature. The poloxamers in each series have varying ratios of PEO and PPO which ultimately determines the hydrophilic-lipophilic balance (HLB) of the material, i.e., the varying HLB values are based upon the varying values of a and b, a representing the number of hydrophilic poly(ethylene oxide) units (PEO) being present in the molecule and b representing the number of hydrophobic poly(propylene oxide) units (PPO) being present in the molecule. In one embodiment, the poloxamer will have an HLB ranging from about 5 to about 24. In another embodiment, the poloxamer will have an HLB ranging from about 1 to about 5.

Poloxamers and reverse poloxamers have terminal hydroxyl groups that are terminal functionalized to provide the crosslinking agents containing at least two ethylenically unsaturated reactive end groups, e.g., poloxamer di(meth)acrylates. An example of a terminal functionalized poloxamer and as discussed herein is poloxamer dimethacrylate (e.g., Pluronic® F127 dimethacrylate) as disclosed in U.S. Patent Application Publication No. 2003/0044468 and U.S. Pat. No. 9,309,357, the contents of which are incorporated by reference herein. Other examples include glycidyl-terminated copolymers of polyethylene glycol and polypropylene glycol as disclosed in U.S. Pat. No. 6,517,933, the contents of which are incorporated by reference herein.

The poloxamer is functionalized to provide the desired reactivity at the end terminal of the molecule. The functionality can be varied and is determined based upon the intended use of the functionalized PEO- and PPO-containing block copolymers. That is, the PEO- and PPO-containing block copolymers are reacted to provide end terminal functionality that is complementary with the intended device forming monomeric mixture. The term block copolymer as used herein shall be understood to mean a poloxamer as having two or more blocks in their polymeric backbone(s).

In another embodiment, suitable crosslinking agents include, for example, an ethylenically unsaturated polymerizable alkoxylated polymer. In illustrative embodiments, an ethylenically unsaturated polymerizable alkoxylated polymer has a number average molecular weight of up to, for example, about 1000, e.g., from about 200 to about 1000. Suitable ethylenically unsaturated polymerizable alkoxylated polymers include, by way of example, polymerizable polyethylene glycols having a molecular weight of up to, for example, about 1000 such as those with CTFA names PEG-200, PEG-400, PEG-600, PEG-1000, and mixtures thereof. Representative examples include PEG-200 dimethacrylate, PEG-400 dimethacrylate, PEG-600 dimethacrylate, PEG-1000 dimethacrylate and the like and mixtures thereof.

In an illustrative embodiment, the monomeric mixture can contain from about 0.5 wt. % to about 50 wt. %, based on the total weight of the monomeric mixture, of the one or more crosslinking agents. In an illustrative embodiment, the monomeric mixture can contain from about 0.5 wt. % to about 30 wt. %, based on the total weight of the monomeric mixture, of the one or more crosslinking agents.

In non-limiting illustrative embodiments, the monomeric mixtures described herein can further contain one or more hydrophilic monomers. Suitable hydrophilic monomers include, for example, amides, vinyl lactams, poly(alkyleneoxy)(meth)acrylates, hydrophilic vinyl carbonates, hydrophilic vinyl carbamates, hydrophilic oxazolones, and poly(alkene glycols) functionalized with polymerizable groups and the like and mixtures thereof. Representative examples of amides include alkylacrylamides where the alkyl group has from 1 to 6 carbon atoms. Suitable alkylacrylamides include, for example, N,N-dimethylacrylamide, N,N-dimethylmethacrylamide, N,N-diethylacrylamide, N,N-diethylmethacrylamide, N,N-diisopropylacrylamide, N,N-diisopropylmethacrylamide and the like and mixtures thereof. Representative examples of vinyl lactams include cyclic lactams such as N-vinyl-2-pyrrolidone, N-vinyl caprolactam, N-vinyl-2-piperidone and the like and mixtures thereof. Representative examples of functionalized poly (alkene glycols) include poly(diethylene glycols) of varying chain length containing monomethacrylate or dimethacrylate end caps. In one embodiment, the poly(alkene glycol) polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. Mixtures of the foregoing hydrophilic monomers can also be used in the monomeric mixtures herein.

As one skilled in the art will readily appreciate, the growth of the polyoxazoline repeating units is based at least in part on the formation of a cation (i.e., the oxazolinium ion) and the reaction between the cation and oxazoline monomers. Therefore, the living cation is necessary through the polymerization process. The cation is usually known for reacting with nucleophiles (e.g., —OH, —NH$_2$, —COOH, water, and the like). Accordingly, it is desirable to select a hydrophilic monomer which does not contain one or more of the foregoing nucleophiles. Thus, in illustrative embodiment, the one or more hydrophilic monomers include one or more of the acrylamides and cyclic lactams described above which do not have those nucleophile moieties, and therefore are believed to be comparable with cationic polymerization.

In an illustrative embodiment, the monomeric mixture can contain from about 5 wt. % to about 90 wt. %, based on the total weight of the monomeric mixture, of the one or more hydrophilic monomers. In an illustrative embodiment, the monomeric mixture can contain from about 10 wt. % to about 80 wt. %, based on the total weight of the monomeric mixture, of the one or more hydrophilic monomers.

In non-limiting illustrative embodiments, the monomeric mixtures described herein can further contain one or more protected hydrophilic monomers. Suitable hydrophilic monomers that need to be protected in order to employed in the monomeric mixtures described herein include unsaturated carboxylic acids, (meth)acrylic substituted alcohols, (meth)acrylic substituted amino compounds and the like. Representative examples of unsaturated carboxylic acids include methacrylic acid, acrylic acid and the like and mixtures thereof. Representative examples of (meth)acrylic substituted alcohols include 2-hydroxyethylmethacrylate, 2-hydroxyethylacrylate, glyceryl methacrylate and the like and mixtures thereof. Representative examples of (meth) acrylic substituted amino compounds include (2-amino) ethyl methacrylate and the like.

Suitable protecting groups include, for example, t-butyloxycarbonyl (also known as BOC), vinyloxycarbonyl, trimethylsilyl, triethylsilyl, methoxymethyl, tetrahydropyranyl, tetrahydrofuranyl, t-butyl (for a carboxylic acid hydrophilic monomer), and toluenesulfonyl (for a carboxylic acid hydrophilic monomer).

Representative examples of protected hydrophilic monomers for use herein are set forth below.

---
Protected HEMA
---

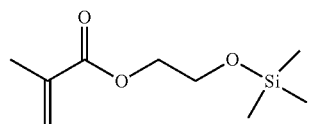

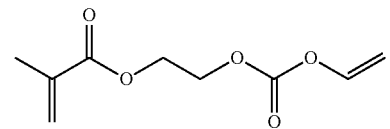

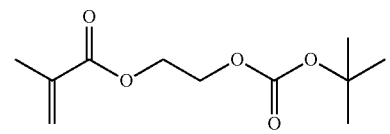 [SMILES: C=C(C)C(=O)OCCOC(=O)OC(C)(C)C]

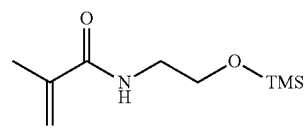

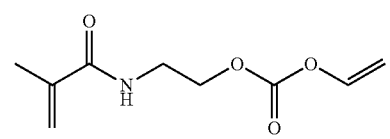

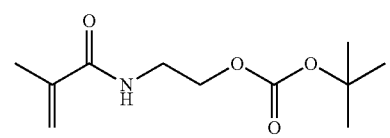 [SMILES: C=C(C)C(=O)NCCOC(=O)OC(C)(C)C]

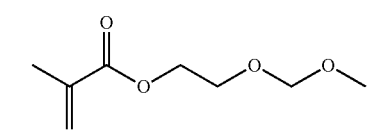

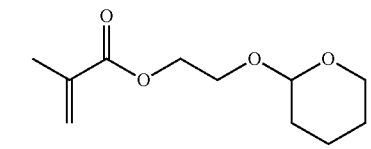

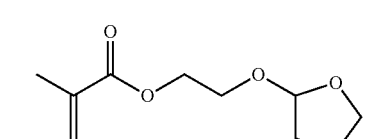

---
Protected (2-amino)ethyl methacrylate
---

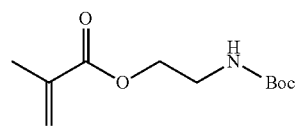 [SMILES: C=C(C)C(=O)OCCNC(=O)OC(C)(C)C]

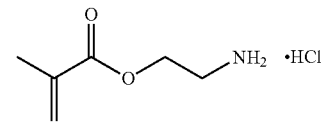

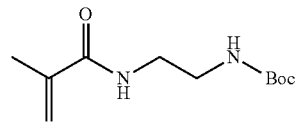 [SMILES: C=C(C)C(=O)NCCNC(=O)OC(C)(C)C]

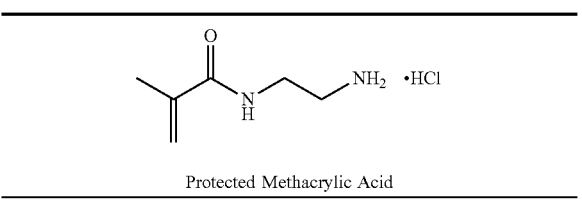

Protected Methacrylic Acid

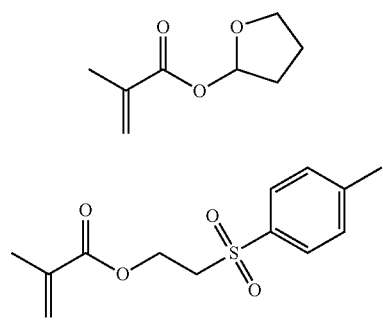

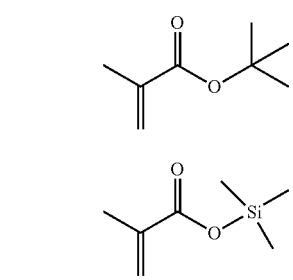

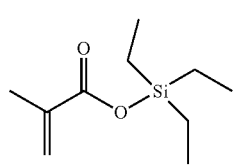

The protected hydrophilic monomers are commercially available from such sources as, for example, Sigma-Aldrich, BOC Sciences and TCI AMERICA, or can be prepared by methods within the purview of one skilled in the art. Representative examples of various synthetic routes to make the foregoing protected hydrophilic monomers are as follows.

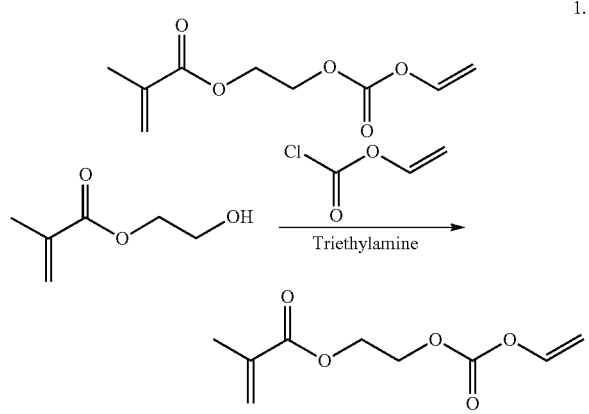

1.

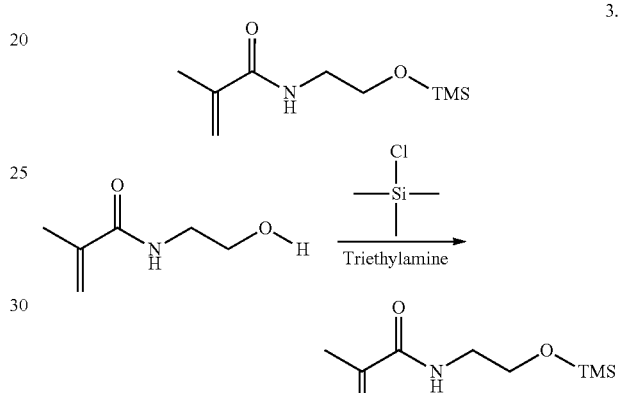

2.

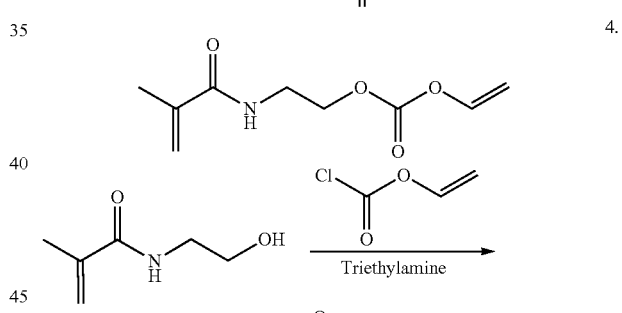

3.

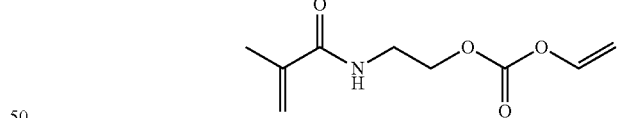

4.

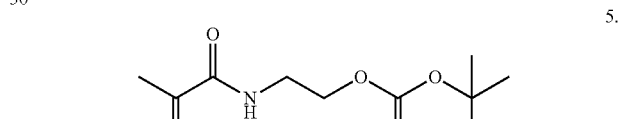

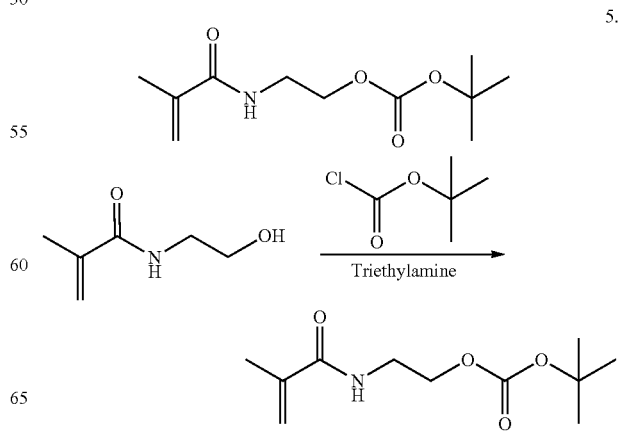

5.

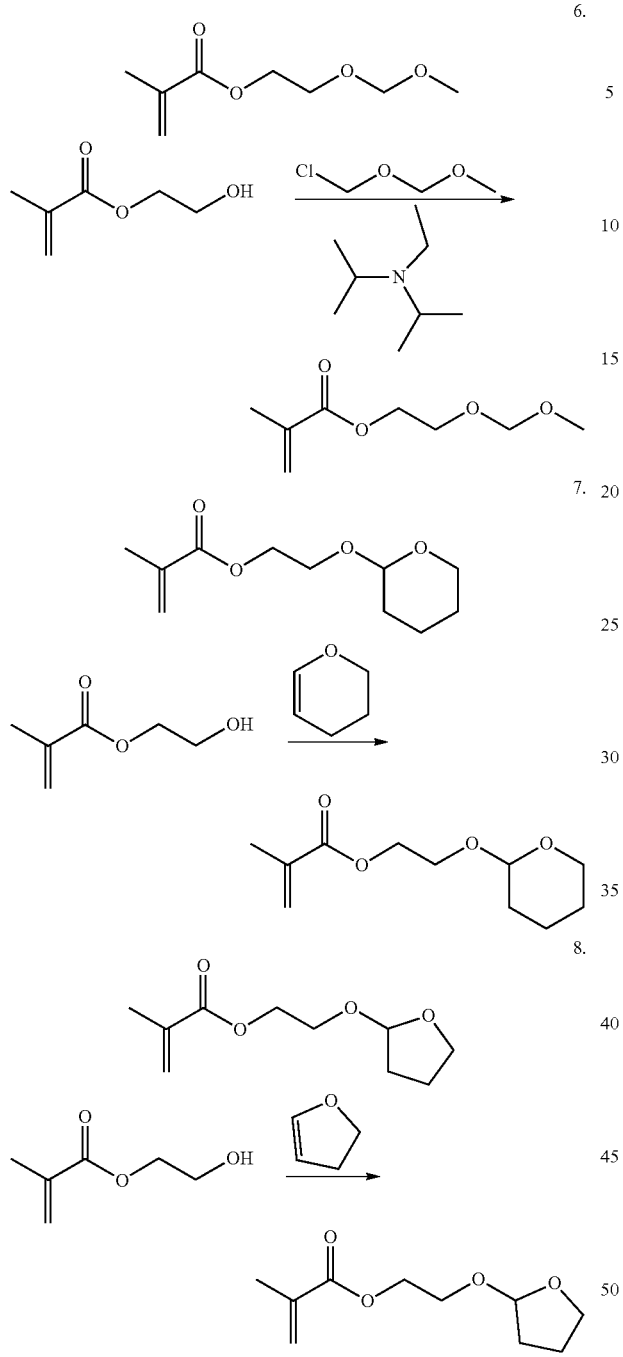

weight of the monomeric mixture, of the one or more protected hydrophilic monomers.

In another illustrative embodiment, the monomeric mixture further includes one or more ultraviolet (UV) blockers. In one illustrative embodiment, suitable UV blockers include, for example, one or more compounds of the following formulae:

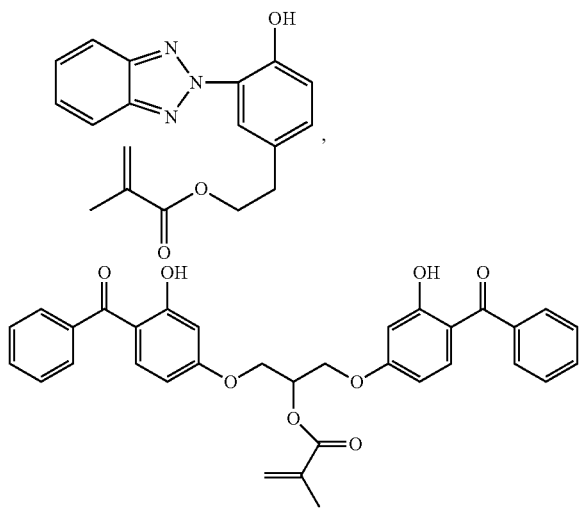

(2-Propenoic acid, 2-methyl,2-(4-benzoyl-3-hydroxyphenoxy)-1-[(4-benzoyl3-hydroxyphenoxy)methyl ester),

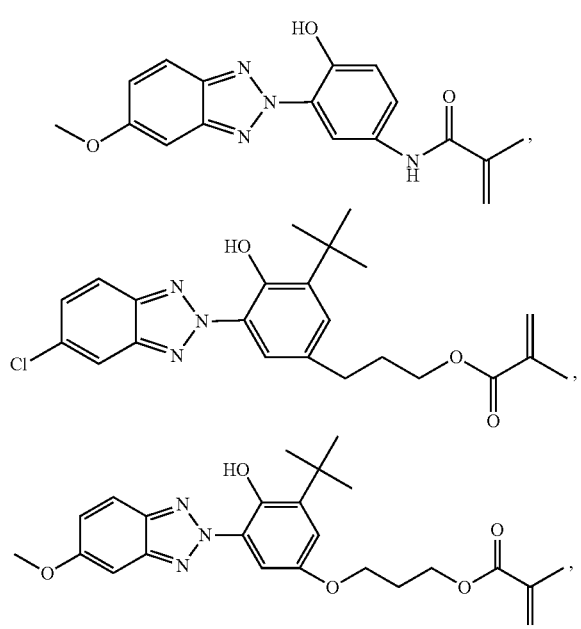

and

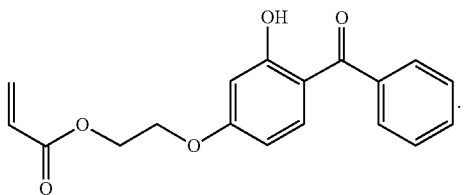

In an illustrative embodiment, the monomeric mixture can contain from about 0 wt. % to about 80 wt. %, based on the total weight of the monomeric mixture, of the one or more protected hydrophilic monomers. In an illustrative embodiment, the monomeric mixture can contain from about 0 wt. % to about 60 wt. %, based on the total weight of the monomeric mixture, of the one or more protected hydrophilic monomers. In an illustrative embodiment, the monomeric mixture can contain from about 0.1 wt. % to about 80 wt. %, based on the total weight of the monomeric mixture, of the one or more protected hydrophilic monomers. In an illustrative embodiment, the monomeric mixture can contain from about 0.1 wt. % to about 60 wt. %, based on the total These compounds are merely illustrative and not intended to be limiting. Any known UV blocker or later developed UV blocker are contemplated for use herein.

Although not necessarily required, the monomeric mixtures described herein may optionally have one or more strengthening agents added prior to polymerization, preferably in quantities of less than about 80 weight percent such as from about 20 to about 60 weight percent. Non-limiting examples of suitable strengthening agents are described in U.S. Pat. Nos. 4,327,203; 4,355,147; and 5,270,418; each of which is incorporated herein in its entirety by reference. Specific examples, not intended to be limiting, of such strengthening agents include cycloalkyl acrylates and methacrylates, e.g., tert-butylcyclohexyl methacrylate and isopropylcyclopentyl acrylate.

The monomeric mixtures to be polymerized may further contain, as necessary and within limits not to impair the purpose and effect of the illustrative embodiments described herein, various additives such as an antioxidant, coloring agent, ultraviolet absorber, lubricant internal wetting agents, toughening agents and the like and other constituents as is well known in the art.

The ophthalmic devices described herein, e.g., contact lenses or intraocular lenses, can be prepared by polymerizing the foregoing monomeric mixtures to form a product that can be subsequently formed into the appropriate shape by, for example, lathing, injection molding, compression molding, cutting and the like. For example, in producing contact lenses, the initial mixture may be polymerized in tubes to provide rod-shaped articles, which are then cut into buttons. The buttons may then be lathed into contact lenses.

Polymerization may be facilitated by exposing a monomeric mixture of the one or more cationic initiators comprising one or more polymerizable groups and the alkyl-substituted oxazoline together with, if desired, the one or more crosslinking agents and/or one or more hydrophilic monomers and/or protected hydrophilic monomers, to heat and/or radiation, such as ultraviolet light, visible light, or high energy radiation. A polymerization initiator may be included in the mixture to facilitate the polymerization step. Representative examples of free radical thermal polymerization initiators include organic peroxides such as acetyl peroxide, lauroyl peroxide, decanoyl peroxide, stearoyl peroxide, benzoyl peroxide, tertiarylbutyl peroxypivalate, peroxydicarbonate, and the like and azo compounds such as 2,2'-azobisisobutyronitrile (AIBN), 1,1'-azobis(cyclohexanecarbonitrile), 4,4'-azobis(4-cyanovaleric acid), and the like. Representative UV initiators are those known in the art and include benzoin methyl ether, benzoin ethyl ether, Darocure® 1173, 1164, 2273, 1116, 2959, 3331 (EM Industries) and Irgacure® 651 and 184 (Ciba-Geigy), 2,2'Azobis(2-methylpropionitrile) (VAZO 64) and the like. Generally, the initiator will be employed in the monomeric mixture at a concentration of about 0.01 to about 5 percent by weight of the total mixture.

Polymerization is generally performed in a reaction medium, such as, for example, a solution or dispersion using a solvent, e.g., water or an alkanol containing from 1 to 4 carbon atoms such as methanol, ethanol or propan-2-ol. Alternatively, a mixture of any of the above solvents may be used.

Generally, polymerization can be carried out for about 15 minutes to about 72 hours, and under an inert atmosphere of, for example, nitrogen or argon. If desired, the resulting polymerization product can be dried under vacuum, e.g., for about 5 to about 72 hours or left in an aqueous solution prior to use.

In an illustrative embodiment, an exemplified synthetic scheme using a duel free radical and cationic polymerization process for obtaining the polymerization product described herein is set forth below.

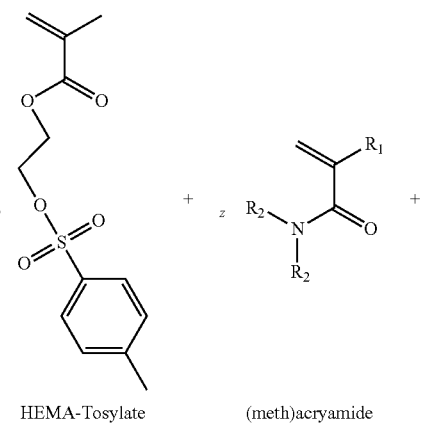

-continued

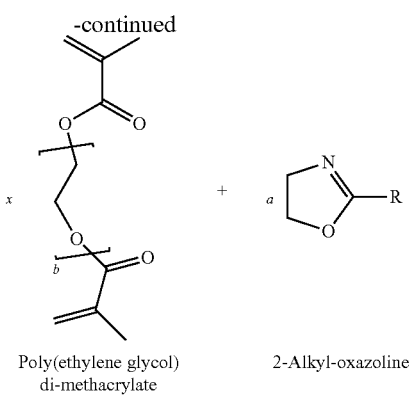

Poly(ethylene glycol) di-methacrylate      2-Alkyl-oxazoline where a is from about 10 to about 100, b is from 1 to about 250, c is from 0 to about 100, x is from 1 to 100, y is from 1 to about 100, and z is from 0 to about 500, $R_1$ is —H or —$CH_3$ and $R_2$ is a $C_1$ to $C_6$.

In another illustrative embodiment, an exemplified synthetic scheme using a duel free radical and cationic polymerization process for obtaining the polymerization product described herein is set forth below.

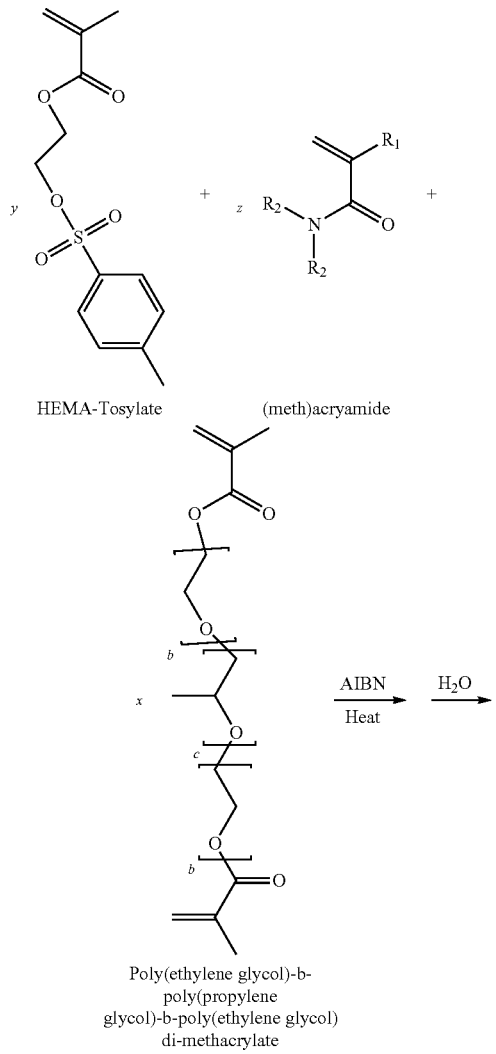

HEMA-Tosylate      (meth)acryamide

Poly(ethylene glycol)-b-poly(propylene glycol)-b-poly(ethylene glycol) di-methacrylate

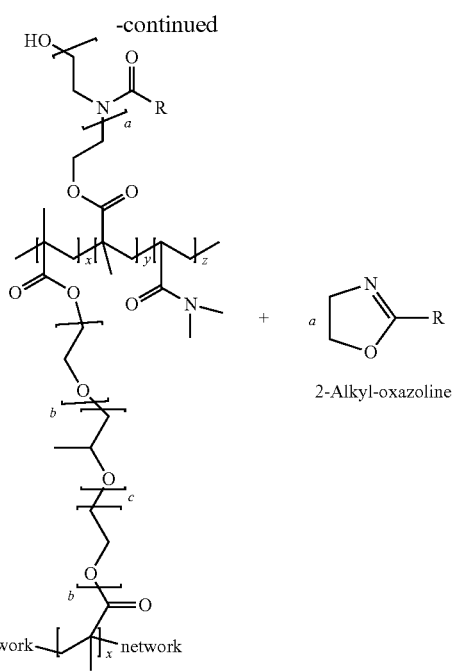

2-Alkyl-oxazoline where a is from about 10 to about 100, b is from about 1 to about 250, c is from 0 to about 150, x is from about 1 to about 100, y is from about 1 to about 100, and z is from 0 to about 50, $R_1$ is —H or —$CH_3$ and $R_2$ is a $C_1$ to $C_6$.

The ophthalmic devices such as contact lenses may be cast directly in molds, e.g., polypropylene molds, from the mixtures, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the mixtures to be polymerized to a mold, and spinning the mold in a controlled manner while exposing the mixture to a radiation source such as UV light. Static casting methods involve charging the mixture between two mold sections, one mold section shaped to form the anterior lens surface and the other mold section shaped to form the posterior lens surface, and curing the mixture while retained in the mold assembly to form a lens, for example, by free radical polymerization of the mixture as discussed above. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a mixture is cured by spincasting in a mold to form a shaped article having an anterior lens surface and a relatively large thickness, and the posterior surface of the cured spincast article is subsequently lathed to provide a contact lens having the desired thickness and posterior lens surface.

Polymerization of the mixtures will yield a polymer, that when hydrated, preferably forms a hydrogel. When producing a hydrogel lens, the mixture may further include at least a diluent that is ultimately replaced with water when the polymerization product is hydrated to form a hydrogel. Generally, the water content of the hydrogel is greater than about 5 weight percent and more commonly between about 10 to about 80 weight percent. The amount of diluent used should be less than about 50 weight percent and, in most cases, the diluent content will be less than about 30 weight percent. However, in a particular polymer system, the actual limit will be dictated by the solubility of the various monomers in the diluent. In order to produce an optically clear copolymer, it is important that a phase separation leading to visual opacity does not occur between the comonomers and the diluent, or the diluent and the final copolymer.

Furthermore, the maximum amount of diluent which may be used will depend on the amount of swelling the diluent causes the final polymers. Excessive swelling will or may cause the copolymer to collapse when the diluent is replaced with water upon hydration. Suitable diluents include, but are not limited to, ethylene glycol, glycerine, liquid poly(ethylene glycol); alcohols, alcohol/water mixtures, ethylene oxide/propylene oxide block copolymers, low molecular weight linear poly(2-hydroxyethyl methacrylate), glycol esters of lactic acid, formamides, ketones, dialkylsulfoxides, butyl carbitol, and the like and mixtures thereof.

If necessary, it may be desirable to remove residual diluent from the lens before edge-finishing operations which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. If desired, the mixture used to produce the hydrogel lens may further include crosslinking and wetting agents known in the prior art for making hydrogel materials.

In the case of intraocular lenses, the mixtures to be polymerized may further include a monomer for increasing the refractive index of the resultant copolymer. Examples of such monomers are aromatic (meth)acrylates, such as phenyl (meth)acrylate, 2-phenylethyl (meth)acrylate, 2-phenoxyethyl methacrylate, and benzyl (meth)acrylate.

The ophthalmic devices such as contact lenses obtained herein may be subjected to optional machining operations. For example, the optional machining steps may include buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

The lens may then be transferred to individual lens packages containing a buffered saline solution. The saline solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative. The examples should not be read as limiting the scope of the invention as defined in the claims.

In the examples, the following abbreviations are used.
DMA: N,N-dimethylacrylamide.
HEMA: 2-hydroxyethyl methacrylate.
AIBN: 2,2'-azobisisobutyronitrile.
Dimethacrylate-PEG: a compound having a number average molecular weight of 550 Da as determined by an intrinsic viscosity measurement.
SA monomer: 2-[3-(2H-Benzotriazol-2-yl)-4-hydroxyphenyl]ethyl methacrylate used as a UV Class I blocker.

Various polymerization products were formed as discussed below and characterized by standard testing procedures such as:

Water %: Two sets of six hydrated lenses or films are blotted dry on a piece of filter paper to remove excess water, and samples are weighed (wet weight). Samples are then placed in a microwave oven for 10 minutes inside a jar containing desiccant. The samples are then allowed to sit for 30 minutes to equilibrate to room temperature and reweighed (dry weight). The percent water is calculated from the wet and dry weights.

Contact Angle: Captive bubble contact angle data was collected on a First Ten Angstroms FTA-1000 prop Shape Instrument. All samples were rinsed in HPLC grade water prior to analysis in order to remove components of the packaging solution from the sample surface. Prior to data collection the surface tension of the water used for all experiments was measured using the pendant drop method. In order for the water to qualify as appropriate for use, a surface tension value of 70-72 dynes/cm was expected. All lens samples were placed onto a curved sample holder and submerged into a quartz cell filled with HPLC grade water. Advancing and receding captive bubble contact angles were collected for each sample. The advancing contact angle is defined as the angle measured in water as the air bubble is retracting from the lens surface (water is advancing across the surface). All captive bubble data was collected using a high-speed digital camera focused onto the sample/air bubble interface. The contact angle was calculated at the digital frame just prior to contact line movement across the sample/air bubble interface. The receding contact angle is defined as the angle measured in water as the air bubble is expanding across the sample surface (water is receding from the surface).

Modulus ($g/mm^2$) was measured per ASTM 1708 employing an Instron (Model 4502) instrument where the film sample was immersed in borate buffered saline; an appropriate size of the film sample was gauge length 22 mm and width 4.75 mm, where the sample further has ends forming a dogbone shape to accommodate gripping of the sample with clamps of the Instron instrument, and a thickness of 100±50 microns.

Gel Fraction: Gel fraction %=Weight of purified dry lens/Weight of unpurified dry lens*100%. Gel fraction % gives a rough number of the conversion of monomers in the curing process and is used to track the completion of curing.

EXAMPLE 1

Synthesis of HEMA-Tosylate.

A 100-mL flask equipped with a stir bar was dried under vacuum with heat gun. (Hydroxyethyl)methacrylate (4.0 g, 31 mmol, 1 equiv.), triethylamine (3.5 g, 34 mmol, 1.1 equiv.), and anhydrous dichloromethane (20 mL) were injected into the flask with syringes. The flask was placed into an iced-bath to cool to 0° C. Next, 4-toluenesulfonyl chloride (6.2 g, 32.5 mmol, 1.05 equiv.) was injected into the solution slowly with a syringe. After injection, the solution was allowed to warm up to room temperature and stirred overnight. The solution was concentrated in a rotary evaporator, then the concentrated crude was purified with flash chromatography of silica gel with eluent (ethyl acetate/hexanes=1/9 to ethyl acetate/hexanes=3/7) to afford HEMA-tosylate as transparent liquid (3.7 g, 42%). $^1$H NMR (400 MHz, CDCl$_3$) δ ppm 1.77-1.93 (m, 3H) 2.36-2.49 (m, 3H) 4.17-4.26 (m, 2H) 4.26-4.37 (m, 2H) 5.47-5.62 (m, 1H) 5.97-6.09 (m, 1H) 7.28-7.40 (m, 2H) 7.71-7.87 (m, 2H).

EXAMPLES 2-10

A monomeric mix was made by mixing the following components, listed in Table 1 at amounts per weight.

TABLE 1

| | Formulation | | | | | | | | |
|---|---|---|---|---|---|---|---|---|---|
| | Ex. 2 | Ex. 3 | Ex. 4 | Ex. 5 | Ex. 6 | Ex. 7 | Ex. 8 | Ex. 9 | Ex. 10 |
| HEMA-Tosyl of Example 1 | 41 | 4 | 4 | 4 | 4 | 4 | 4 | 3 | 2 |
| DMA | — | 27 | 27 | 27 | 27 | 27 | 27 | 27 | 27 |
| 2-Methyl-2-oxazoline | 44 | 48 | 48 | 48 | 48 | 53 | 57 | 53 | 53 |
| Dimethacrylate-PEG | 0.13 | 1 | 2 | 3 | 4 | 4 | 4 | 4 | 4 |
| Poloxamer 407DM | — | 8 | 8 | 8 | 8 | 12 | 8 | 12 | 12 |
| AIBN | 1.96 | 0.25 | 0.25 | 0.25 | 0.25 | 0.25 | 0.25 | 0.25 | 0.25 |
| Dioxane | 12.85 | 12.5 | 12.5 | 10.5 | 9.5 | 0 | 0 | 0 | 0 |
| Total | 99.94 | 100.75 | 101.75 | 100.75 | 100.75 | 100.25 | 100.25 | 99.25 | 98.25 |
| Water content % | — | — | — | — | 79.1 | 79.2 | 79.5 | 80.0 | 80.9 |
| Gel Fraction % | — | — | — | 85.7 | 89.4 | 79.2 | 79.5 | 79.6 | 83.0 |
| CBCA | 40 | 51 | 56 | 52 | 57 | 56 | 58 | 59 | 60 |
| Modulus | — | — | 37 | 46 | 71 | 62 | 79 | 57 | 60 |

The resultant monomeric mixtures were cast into contact lenses by introducing the monomeric mixture to a polypropylene mold assembly. Then, the mold assembly and monomeric mixture were cured by purged with N$_2$ for 3 hours at 25° C., heated at 63° C. for 20 minutes, heated at 93° C. for 30 minutes, heated at 110° C. for 1 hour, then cooled to 55° C. in 1 hour to form a contact lens. The resultant contact lenses were released from the mold assembly, extracted with de-ionized water and placed in a borated buffer solution before being autoclaved.

EXAMPLES 11-17

A monomeric mix was made by mixing the following components, listed in Table 2 at amounts per weight.

The resultant monomeric mixtures were cast into contact lenses by introducing the monomeric mixture to a polypropylene mold assembly. Then, the mold assembly and monomeric mixture were cured by heating the mixture for 30 minutes at 65° C. and heating for an additional 4.5 hours at 100° C. to form a contact lens. The resultant contact lenses were released from the mold assembly, extracted with de-ionized water and placed in a borated buffer solution before being autoclaved.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present formulations and are disclosed herein just as if each and every such sub-combination was individually and explicitly disclosed herein.

It will be understood that various modifications may be made to the non-limiting illustrative embodiments disclosed herein. Therefore, the above description should not be construed as limiting, but merely as exemplifications of preferred embodiments. For example, the functions described above and implemented as the best mode for operating the non-limiting illustrative embodiments are for illustration purposes only. Other arrangements and methods may be implemented by those skilled in the art without departing from the scope and spirit herein. Moreover, those

TABLE 2

| | Formulation | | | | | | |
|---|---|---|---|---|---|---|---|
| | Ex. 11 | Ex. 12 | Ex. 13 | Ex. 14 | Ex. 15 | Ex. 16 | Ex. 17 |
| HEMA-Tosyl of Example 1 | 4 | 3 | 2 | 4 | 3 | 2 | 2 |
| DMA | 27 | 27 | 27 | 27 | 27 | 27 | 27 |
| 2-Methyl-2-oxazoline | 53 | 53 | 53 | 53 | 53 | 53 | 51 |
| Dimethacrylate-PEG | 4 | 4 | 4 | 4 | 4 | 4 | 4 |
| Poloxamer 407DM | 8 | 12 | 12 | 8 | 12 | 12 | 12 |
| AIBN | 0.25 | 0.25 | 0.25 | 0.25 | 0.25 | 0.25 | 0.25 |
| SA monomer | — | — | — | — | — | — | 2 |
| Total | 96.25 | 99.25 | 98.25 | 96.25 | 99.25 | 98.25 | 98.25 |
| Water content % | 80.0 | 81.1 | 81.6 | 80.95 | 81.22 | 82.01 | 79.1 |
| Gel Fraction % | 81.8 | 83.3 | 86.2 | 77.9 | 81.8 | 83.1 | — |
| CBCA | — | — | — | 58 | 58 | 58 | 61 |

What is claimed is:

1. An ophthalmic device which is a polymerization product of a monomeric mixture comprising:
   (a) one or more cationic initiators comprising one or more polymerizable groups; and
   (b) one or more alkyl-substituted oxazolines.

2. The ophthalmic device according to claim 1, wherein the one or more cationic initiators comprising one or more polymerizable groups comprise one or more sulfonate cationic initiators comprising one or more polymerizable groups.

3. The ophthalmic device according to claim 1, wherein the one or more cationic initiators comprising one or more polymerizable groups comprise one or more of a substituted or unsubstituted alkyl- and aryl-containing sulfonate cationic initiator comprising one or more polymerizable groups or a fluorinated substituted or unsubstituted alkyl- and aryl-containing sulfonate cationic initiator comprising one or more polymerizable groups.

4. The ophthalmic device according to claim 1, wherein the one or more cationic initiators comprising one or more polymerizable groups comprise one or more sulfonate cationic initiators selected from the group consisting of tosylate, nosylate, mesylate, and triflate, each comprising one or more polymerizable groups.

5. The ophthalmic device according to claim 1, wherein the one or more polymerizable groups of the one or more cationic initiators comprise one or more of a (meth)acrylate end group, a vinyl end group, and an acrylamide end group.

6. The ophthalmic device according to claim 1, wherein the one or more cationic initiators comprising one or more polymerizable groups are derived from a reaction product of a hydroxyl-containing (meth)acrylate and a compound of the formula R—SO$_2$—X where R is a hydrocarbon radical or moiety and X is a halogen.

7. The ophthalmic device according to claim 1, wherein the polymerization product comprises a brush polymeric network comprising poly(2-alkyloxazoline) repeating units in the polymer backbone represented by the formula:

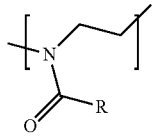

where R is an alkyl group of 1 to 12 carbon atoms.

8. The ophthalmic device according to claim 7, wherein the brush polymeric network comprises from about 3 to about 150 repeating units of the poly(2-alkyloxazoline) in the polymer backbone.

9. The ophthalmic device according to claim 1, wherein the monomeric mixture comprises:
   about 0.1 wt. % to about 30 wt. %, based on the total weight of the monomeric mixture, of the one or more cationic initiators; and
   about 10 wt. % to about 80 wt. %, based on the total weight of the monomeric mixture, of the one or more alkyl-substituted oxazolines.

10. The ophthalmic device according to claim 1, wherein the monomeric mixture further comprises one or more crosslinking agents.

11. The ophthalmic device according to claim 10, wherein the one or more crosslinking agents comprise an ethylenically unsaturated polymerizable alkoxylated polymer.

12. The ophthalmic device according to claim 11, wherein the one or more ethylenically unsaturated polymerizable alkoxylated polymers comprise one or more polymerizable polyethylene glycols having a number average molecular weight of 100 to about 1000.

13. The ophthalmic device according to claim 10, wherein the one or more crosslinking agents comprise one or more end functionalized poloxamers.

14. The ophthalmic device according to claim 10, wherein the monomeric mixture comprises about 0.5 wt. % to about 30 wt. %, based on the total weight of the monomeric mixture, of the one or more crosslinking agents.

15. The ophthalmic device according to claim 1, wherein the monomeric mixture further comprises one or more hydrophilic monomers selected from the group consisting of an acrylamide and a vinyl lactam.

16. The ophthalmic device according to claim 15, wherein the monomeric mixture comprises about 10 wt. % to about 80 wt. %, based on the total weight of the monomeric mixture, of the one or more hydrophilic monomers.

17. The ophthalmic device according to claim 1, wherein the monomeric mixture further comprises one or more protected hydrophilic monomers selected from the group consisting of a protected (meth)acrylic acid and a protected hydroxyl-containing-(meth)acrylate.

18. The ophthalmic device according to claim 1, wherein the monomeric mixture further comprises one or more ultraviolet blockers.

19. The ophthalmic device according to claim 1, which is one or more of a contact lens, an intraocular lens and a corneal implant.

20. A method for making an ophthalmic device, comprising:
   (a) providing an ophthalmic device-forming monomeric mixture comprising:
      (i) one or more cationic initiators comprising one or more polymerizable groups; and
      (ii) one or more alkyl-substituted oxazolines;
   (b) subjecting the mixture to polymerization conditions to provide a polymerized ophthalmic device; and
   (c) hydrating the polymerized ophthalmic device.

* * * * *